United States Patent [19]

Ronge

[11] 4,354,941

[45] Oct. 19, 1982

[54] PROCESS FOR CONTINUOUS SEPARATION OF POLLUTING MATTER FROM A CARRIER FLUID

[76] Inventor: Georg Ronge, Schuhbauerstrasse #11, D-8311 Adlkofen, Fed. Rep. of Germany

[21] Appl. No.: 225,720

[22] Filed: Jan. 16, 1981

[30] Foreign Application Priority Data

Mar. 10, 1980 [DE] Fed. Rep. of Germany ....... 3009160

[51] Int. Cl.³ .............................. C02F 1/24; C02F 1/52
[52] U.S. Cl. .................................... 210/706; 210/711; 210/717
[58] Field of Search ............................... 210/703–708, 210/710, 711, 741, 712, 713, 717, 667, 671, 221.1, 221.2, 924

[56] References Cited

U.S. PATENT DOCUMENTS

| | | | |
|---|---|---|---|
| 3,128,248 | 4/1964 | Suzuki et al. ....................... | 210/706 |
| 3,446,732 | 5/1969 | Gasser et al. ........................ | 210/705 |
| 3,749,667 | 7/1973 | Lindstrom ........................... | 210/924 |
| 3,884,803 | 5/1975 | Traylor ................................ | 210/704 |
| 3,931,005 | 1/1976 | Gasser ................................. | 210/708 |
| 4,186,094 | 1/1980 | Hellberg ........................... | 210/221.2 |

FOREIGN PATENT DOCUMENTS 1102109  3/1961  Fed. Rep. of Germany .

*Primary Examiner*—Benoit Castel
*Attorney, Agent, or Firm*—Paul J. Cook

[57] ABSTRACT

A contaminated carrier liquid in a chamber is cleaned by adding thereto oil particles having a charge and a composition that induces the formation of an hydroxide floc to form an intermediate filtering layer in the chamber. A top clean oil layer is recovered and a bottom clean aqueous layer is recovered. The intermediate layer can be treated to form a composition that can be recycled to form an hydroxide floc.

15 Claims, 4 Drawing Figures

PROCESS FOR CONTINUOUS SEPARATION OF POLLUTING MATTER FROM A CARRIER FLUID

BACKGROUND OF THE INVENTION

This invention relates to the process for continuously separating polluting matter from a carrier fluid. More particularly, this invention relates to a process for removing pollutants from a carrier fluid by introducing charged small particles for inducing the formation of charged small particles in the carrier fluid to attract and concentrate the pollutants which then are seperated from the carrier fluid.

The process of this invention provides a considerable lowering of the costs for the treatment of a polluted carrier fluid both with regard to the investment required and the costs of operating the process. Through this invention, continuous seperation of pollutants from a carrier medium is possible at a lower level of technical and chemical complexity than is available in the prior art. The process of this invention also is suited for solving difficult problems in cleaning waste water for both smaller and larger plants.

Prior to the present invention, quite complex processes have been used to clean carrier fluids, for example dirt-carrying mixtures of oil and water, such as oil emulsions having been used for boring and grinding to the extent that the filtrate may be released into the public waste water system. In the usual processes in use today, hydroxide or hydroxide-producing substances are added to the polluted waste water. The waste water must be strongly alkaline and then strongly acidic. Thereafter, it is usually heated up to close to the boiling point if one does not prefer to let the cleaning and precipitating process take place slowly in elaborate waste water treatment plants. It has also been suggested to use flotation by pumping in air or by bringing the part of the waste water consisting of oil up to the surface of vessels with the help of filtering agents. Flotation, achieved by adding oily or oil-containing substances are used in mining technologies or one uses flotation through the development of gases produced at electrodes by electrolysis of the waste water. Small particles are also used to bind the oil and the dirt, for example with sublimated silicon acid (aerosil). By these procedures, voluminous amounts of sludge are produced, the operating costs are high and they entail many technical difficulties. Also, several of these processes are operated discontinuously whereby the individual batches have to be treated separately.

SUMMARY OF THE INVENTION

The process of this invention for the separation of polluting matter from a carrier fluid is characterized by building up and maintaining a supporting agent with the combined characteristics of a filtering layer floating above the cleaned carrier fluid being located below an oil layer and consisting of the separated pollutants. Keeping the filtering layer in place is achieved by continuously adding oil as particles having a charge and a material which produces insoluble hydroxide to the contaminated carrier liquid and allowing the added material to migrate to the filtering layer as a sludgelike material. The oil to be added to the filtering layer is pumped under high pressure through a nozzle to form liquid particles having a charge that are introduced into a stream of carrier fluid to be treated. The charged particles function to selectively attract the pollutants into a relatively low density filtering layer that floats on a volume of pollutant-free carrier fluid. The carrier fluid migrates through the filtering layer wherein the pollutants are selectively attracted by the charged particles in the filtering layer and the carrier fluid emerges from the filtering layer in a pollutant-free state. Similarly, oil originally in the carrier liquid and/or added thereby migrates upwardly through the filtering layer.

DESCRIPTION OF SPECIFIC EMBODIMENTS

Figure 1:
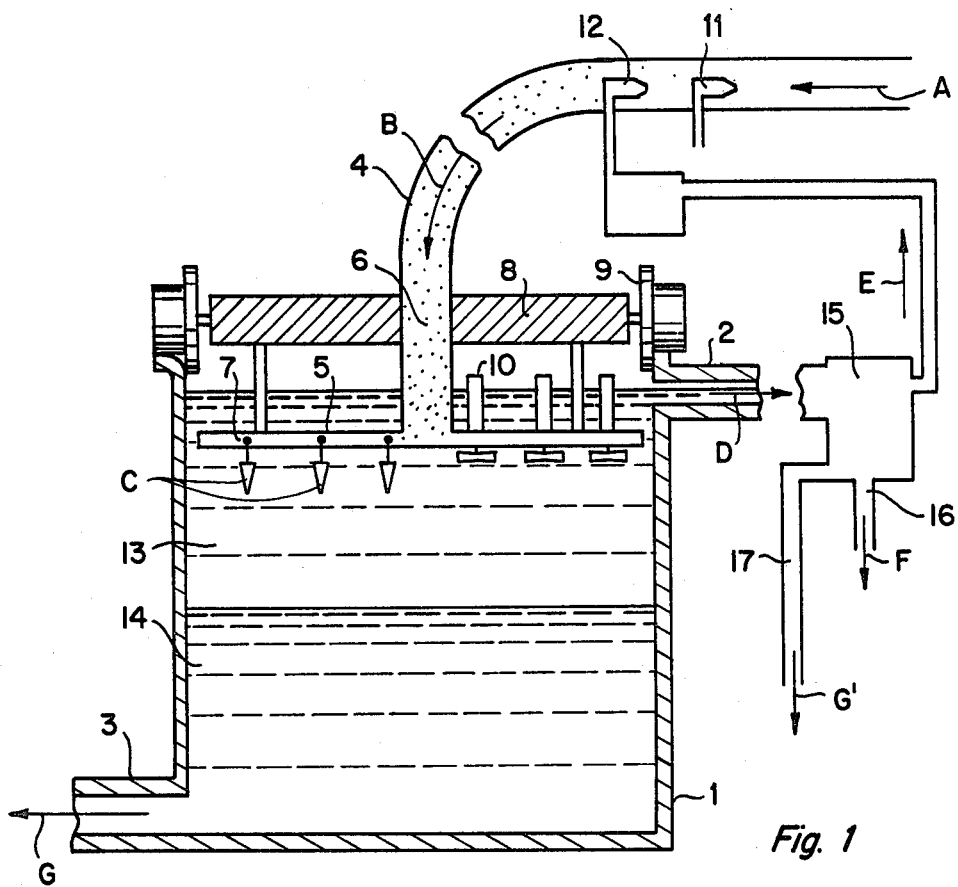
Figure 2:
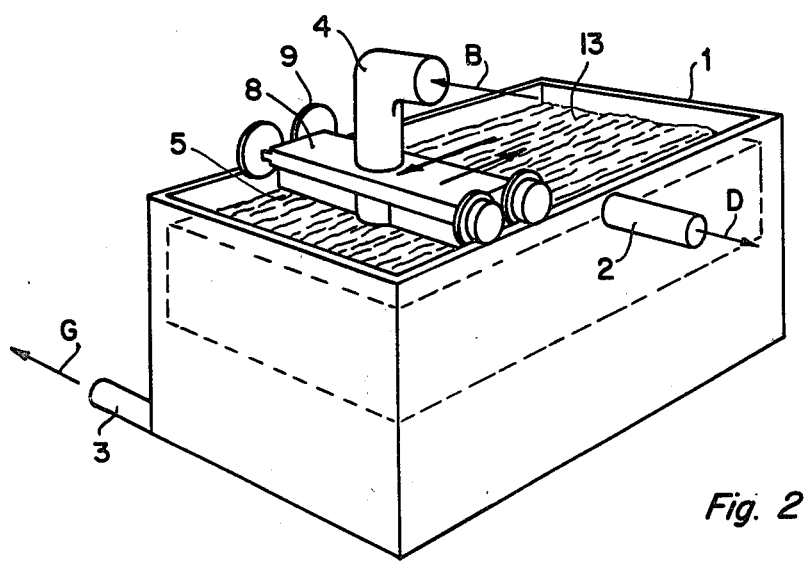

The process of this invention is suitable for treating aqueous compositions containing oil and particulate matter. The process of this invention is equally suitable for the separation of the most varied kinds of pollutants and it achieves purification levels which up till now have been achieved by only very few methods, and which are much better than those achieved by other processes. For example, in cases wherein a maximum level of oil pollution of 100 mg/liter is required, the process of this invention has a separation effect which achieves an oil pollution content of about 2 mg/liter or less with an investment of about 25% and a running cost of between about 10 and 1% compared to more presently available processes. Oil-cleaning effects of 99.99% are the rule for example when treating cleaning oil emulsions used for drilling and grinding at a cost of about 10–20 cents per cubic meter waste water when using the process of this invention.

This invention is further characterized in one embodiment by the addition of a combination of two materials. First, a floc-producing agent to form insoluble hyroxide is added to develop a filtering agent. For example, with alkaline waste water, metal salts such as aluminum salts, magnesium salts, silicates or the like and/or acids such as hydrochloric acid, sulfuric acid or the like are added. When treating nonalkaline waste water, an alkali metal hydroxide also is added such as sodium hydroxide, potassium hydroxide, calcium hydroxide or the like. Second, for the simultaneous regulation of the coagulation and the floating ability of the filtering layer, oil in charged particle form or in a form which emulsifies in the carrier fluid medium is added. For strongly polluted water, proportionately less oil may be added; for little or nonpolluted carrier fluid, proportionately more oil is added. The materials are added to the contaminated carrier liquid and rise through the carrier liquid to entrain the pollutants therein.

The purification process of this invention is furthermore characterized by two more very important advantages. All known modern processes for oil seperation, for example oil emulsions used for drilling and grinding, require for the separation of the oil either costy centrifuges or presses or thermal energy, whereby all of the waste water treated must be heated almost to the boiling point. Ofter both methods are being used simultaneously whereby the waste water is heated and then run through a centrifuge. Other processes which are used presently have complex filtering plants for the cleaning process. That which remains is voluminous oil sludge often consisting of up to 20% of the total volume of the waste water. This has to be burnt specially and the technical handling is difficult due to the greasiness of the oil sludge.

The process of this invention does not have the difficulties described above. All the waste water can be treated at room temperature. The filtrate runs as clear as tap water from the filtering layer. The separated oil, e.g.

hydrocarbon oil, vegetable oil, acetone, etc. is transparent and practically free of water without the need for a centrifuge or other mechanical force. In addition, the remaining sludge which is concentrated very much so that it constitutes around 2-4% of the total volume, can be treated by an added cleaning facility so that all of the oil in the waste water can be separated in the above mentioned transparent form and the remaining dirt of all of the waste water falls out in dry form constituting at an average ½% of the total volume of the waste water.

When the additional cleaning process described below is used, then one can separate, for example, an oil emulsion used for drilling and grinding without mechanical means and without a paper filtering plant, into its three components: a clear filtrate, the oil originally in the waste water in the form of transparent oil and the solid portion originally in the waste water in a practically oil-free, dry and technically easily handled form.

According to the invention, the floating filtering layer is built up and kept at a depth of at least about 50 cm and usually between about 50 and 200 cm, depending on the kind of pollutants, the rate of flow and the form of the filtering body. For the ordinary kind of cleaning problems, a good depth of the floating filtering layer was found to be about 120 cm. The size of this floating filtering layer is regulated through facilities to drain away the filtering layer and/or to throttle the flow in and out of the carrier fluid. Thus, in the process of this invention, the facilities for running it are at the same time the facilities for draining away the separated pollutants. The process can be regulated through fully automatic central electronic control equipment utilizing photo cells, thermal sensors and pH-sensors which regulate and supervise the flow of the different agents in a manner well known in the art.

According to another feature of this invention, it is possible that the polluted carrier fluid with the added filtering agent is not fed onto the surface or to the outside of the filtering layer as is usual practice in prior art filtering methods, although it would, of course, be possible to do so in accordance with this invention. It is preferred as being most efficient to direct the waste water, after pretreatment with the charged liquid particles, to the interior of the floating flitering layer, preferably to an area about 5-40 cm below its top surface. It is also preferred to spread the added mixture containing the charged particles over the whole area of the floating filtering layer under the influence of a horizontal movement. By operating in this manner, added material can be stirred or whirled into the floating filtering layer.

The floating filtering layer which functions as a filtering agent consists of a sticky pulp which contains all the oil and the polluting substances of the original waste water-oil-emulsion which was to be cleaned. The dirt and the oily parts come together very quickly to form this pulp within a few minutes. The substances of the concentrated pulp are brought together and held together so densely that even moving, shaking or stirring it may tear the pulp apart, but the pulp does not dissolve nor does it become watery. When the pulp comes to rest, the pulp droplets immediately join together again to form a dense oil-sludge layer.

The floating filtering layer consisting of the oil sludge is characterized by a precisely defined boundary surface contacting the filtrate, e.g., the cleaned carrier liquid upon which the filtering layer is floating. When treated waste water is added into this filtering layer, the filtate comprising the cleaned carrier fluid diffuses downwards through this surface. Similarly, unbound oil diffuses upwardly through the filtering layer to form a clear oil layer.

Suitable apparatus for implementing the process of this invention consists of a filtering chamber with an upper drainage or outflow of filtering agent, i.e., of seperated pollutants which no longer are needed for the filtering layer, i.g., for the filtering effect. It also has a lower drainage or outflow for cleaned carrier fluid. Yet another characteristic of the device is an inlet for the waste water which is to be treated, lying within the chamber under the upper drainage, as well as an afterfilter or deposition chamber lying after the filtering chamber. Naturally, the process functions even if the inlet is arranged in other ways.

In order to distribute the mixture which is to be treated evenly over the total cross-section of the floating filter, at least one device suitable for horizontal distribution of the mixture may be attached to the inlet for the carrier fluid which is to be treated and it can be movable horizontally so as to cover the entire filtering surface. Furthermore, the inlet or the distributor for introducing the mixture into the filtering layer may be equipped with devices tat stir or whirl it. Alternatively, the input of the mixture to be treated may be done through flows or jets which distribute the mixture as evenly over the filtering layer as possible.

Usually, this arrangement is adequate for a degree of cleaning which complies to normal demands, since the carrier fluid leaves the filtering chamber practically crystal clear. There are, however, some mixtures which, even after treatment, contain a small excess of substances which have been added to the polluted carrier fluid in order to form the filtering agent. In such cases, there is added to the above-mentioned filtering chamber another filtering chamber which permits treatment through a filter medium such as filtering stones, foils or tissues. The second chamber may also include an upper drainage for floating matter and a lower drainage for sinking matter, i.e. for excess oil or coagulated particles. This second filtering chamber may also be substituted with any other available filter means. In the attached diagrams, two examples of different forms of a device for carrying out this invention are shown.

In an essential aspect of this invention, the filtering layer is formed by creating a stream of charged liquid particles within the contaminated liquid. The charged liquid particles are formed by subjecting a body of the liquid (oil) to high pressure of at least about 600 atmospheres, usually between about 600 and 900 atmospheres and then forcing the pressurized liquid through a small orifice directly into the contaminated liquid. The liquid is pressurized and exited from an orifice into the contaminated liquid in the absence of a gas. This contrasts with pressure of about 150 atmospheres in a conventional diesel fuel injector for diesel engines. When it is desired to form a mist of water particles, the lower pressure limit is about 400 atmospheres since water is slightly more compressible than oil. By operating at these high pressures and by controlling the size of the orifice, the liquid exiting from the orifice immediately explodes into a fine mist of electrostatically charged particles having a particle size between about 0.5 and 15 microns, preferably between about 0.5 and 5 microns. It is essential to operate at least about 600 atmospheres to produce the fine mist rather than a continuous liquid stream. If an intermittent liquid stream is exited directly from the nozzle rather than a mist, the charged small sized particles will not be produced and the desired separation of contaminating materials will not be effected. The individual mist droplet, by virtue of its electrostatic potential, attracts the contaminating particles in its vicininty due to the existing difference in the electrostatic potential. Through the coagulation which thus is achieved with the contaminating particles, the electric potential of the droplets changes in relation to the other particles and conglomerates in its vicinity thereby coagulating further. Within seconds massive coagulation occurs between contaminating particles and mist droplets forming growing coagulation complexes consisting of hundreds of thousands of contaminating particles and mist droplets.

Certain criteria have to be put on the mist which is to be used to achieve the effects described above for carrying out the process, and achieving this is therefore an important part of the process of this invention. From the theoretical discussion, it is evident that the finer, for example, a certain amount of liquid is atomized, the greater is the sum of the newly generated surface areas of the total mist. Also, the electrical potential caused by the emergence of the new surface areas is relative to the new surface areas.

If these mist droplets are very small, if they, for example, have a diameter of less than 0.5 microns, then it has been shown that their absolute effect is too small to move the contaminating particles in their vicinity so as to achieve sufficient coagulation.

FIG. 1 is a cross-sectional view of a device for carrying out this invention.

FIG. 2 is a perspective view of the device of FIG. 1.

FIG. 3 is a cross-sectional view of a device with an attached settling chamber.

FIG. 4 is a cross-sectional view of a liquid atomizer for use in this invention.

In FIG. 1, the filtering chamber, such as a vessel of sheet metal or synthetic material, contains an upper drainage outlet 2 for the filtering layer 13 which is drained away from the chamber 1 in the direction of arrow D. A lower drainage outlet 3 for the cleaned carrier fluid is provided for outlet flow away in the direction of arrow G. Under the vertical level of outlet drainage 2, an inlet 6 is provided for the mixture containing the filtering agent. The inlet 6 is equipped with a horizontal distributor 5 and inlet openings 7 through which the mixture is introduced into the interior of the floating filtering layer 13 in the direction of arrow C. As indicated on the right hand side of the distributor 5, the distributor 5 can be equipped with whirling or stirring elements 10, if desired. The influx of the polluted carrier fluid to which has been added filtering agents for utilization in the filtering layer 13 is preferably done at depths of between 5 and 40 cm under the top surface of the floating filtering layer 13. The input channel 4 with inlet 6 can be attached to a horizontally movable trolley 8 with rollers 9 or it can be moved horizontally in any other way in order to distribute the input mixture over the cross-sectional area of the filtering layer 13. The polluted carrier fluid arrives into the inlet channel 4 in the direction of arrow A. In the channel, there is added, in this case through nozzles 11 and 12, for example, the floc-producing agent and oil in disperse form for the creation of small charged oil particles to effect filtering out of the pollutants in the polluted carrier fluid.

The input of floc-producing agents, such as salts, caustic or acidic substances into the polluted transport medium for the production of flocs can also be done in separate mixing vessels. The waste water continuously flows through these mixing vessels whereby the amounts of desired or necessary substances added in the above-described form is regulated through a conventional automated electronic control system which gets its input from conventional pH-probes. The additives can also be measured mechanically through conventional throttle valves whereby the added liquids are injected into the waste water which is to be treated with the aid of pressurized air.

The input of oil into the carrier fluid which is to be cleaned should be done so that the oil, which should be in as disperse a form as possible, so as to maximize charge density on the oil particles, quickly attaches itself to the flocs that develop. This form of highly disperse oil can be achieved through a high pressure nozzle which atomizes the oil into particles that are between about 1 and 5 microns large, preferably about 2 microns. These small particles have a high electrostatic charge and immediately spread themselves uniformly by electrostatic diffusion, without any added mechanical mixing. Due to their charge, they are attracted to the flocs being produced within a very short time after introduction. Through their low specific weight, the oil particles carry the flocs upwards. All other oil and dirt particles are bound to the flocs, thereby permitting the clean carrier fluid to flow down into the lower part of the filtering chamber where it can be removed as described.

The mixture of the waste water, the salt solutions, floc-producing agents and oil flows in the direction of arrow B to inlet 6. The filtering agent can be drained away through the upper drainage conduit 2 consisting of separated pollutants with a high concentrated oil and dirt content. The oil and dirt can be separated in a separator or in some other separating device 15 into its components of oil, dirt and water. The part consisting of pure oil is led in the direction of arrow E and is reused in the development of the filtering agent. The separated pollutants that are now highly concentrated and containing only very little oil are taken through outlet 16 in the direction of arrow F for burning or for storage if they cannot be used in any other way.

The clear water which remains is removed through outlet 17 in the direction of arrow G'. If it is not clear enough, it is led back to the water which is to be cleaned in the inlet 6 of the filtering chamber. The carrier fluid which has diffused downwards and which leaves through drainage 3 can usually be seen as the filtrate. The necessary thickness of the floating filtering layer 13 and the level at which it floats can, in principle, be decided through correct choice of the level of the upper drainage 2, of the input channel of distributor 5 and by throttling the drainage 3. The desired control can be achieved either mechanically of electronically as discussed above. When one treats the carrier fluid of different pollution levels, it is possible to let input 6 be vertically adjustable. This permits a fine adjustment possible for every kind of mixture to be treated. The separation of the floating filtering sludge from the sinking carrier fluid can be accelerated by attaching prodiled surfaces in the region of the floating filtering layer 13.

The remaining sludge in chamber 15, which is about 2–4% of the volume of the waste water can be treated further. When, for exapmle, hydrochloric acid or other industrial acidic waste in desired amounts is added to the sludge and is heated to between 65° C. and 75° C., then the hydroxide which constitutes the main part of the sludge is converted to salts which are dissolved in the water in the sludge. The remaining oil in the sludge immediately rises to the surface and can be removed by decantation in the usual manner. The salt solution which forms is used as a floc-producing agent and is added to the waste water in the beginning of the cleaning and filtering process as described above. The need for freshly added floc-producing agents is thereby reduced to between about 20 and 30% of the amounts that otherwise could be needed. The remaining dirt from all the waste water is free from oil and free from hydroxides. It can be filtered off in any conventional manner and is obtained as a dry substance. At this point, the waste water is separated into the three above-mentioned components; a clear water filtrate, transparent oil free of water and a remainder of technically easily handled dry substance.

Figure 3:
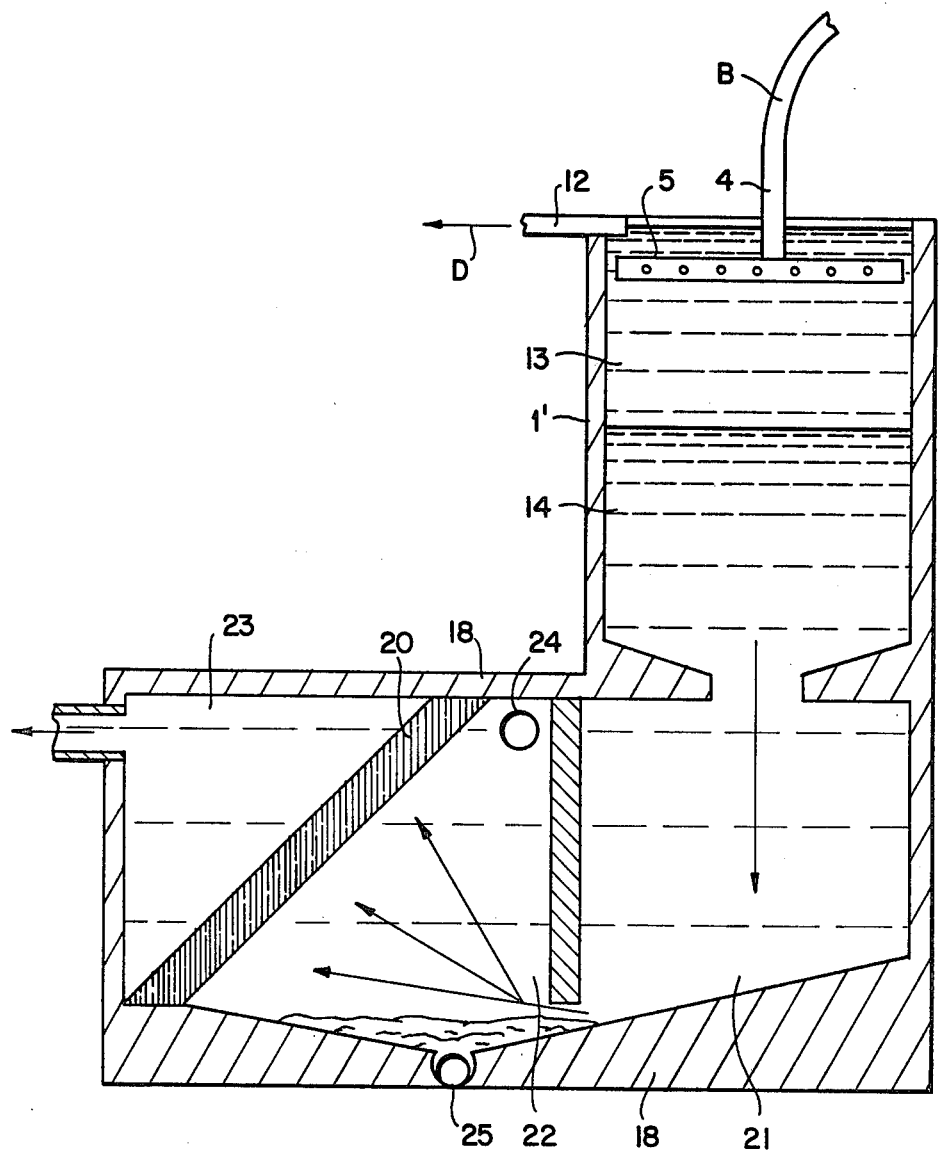

As shown in FIG. 3, settling chambers 18 are attached under the filtering chamber. The settling chambers 21 and 22 and the drainage chamber 23 are provided for the clean carrier fluid. As shown in FIG. 3, the drainage chamber is preceded by a filtering stone 20. Remaining floating pollutants, of which there are only very little, are retained by the filtering stone 20 and they settle at the top from where they are drained away from the settling chamber through a drainage channel 24. The remaining pollutants that sink, such as the small amounts of excess floc-producing agents that settle at the bottom of compartment 22 are drawn off through conduit 25. Due to the inclined filtering stone or filtering foil 20 through which the waste water flows at an angle, the substances lighter than the transporting agent slide upwards whereas the heavier ones slide downward so that the stone or the foil does not become clogged. The portion of the stone or foil facing downwards may become covered with washed up hydroxide. This layer of hydroxide retains even the finest pollutants and oil remnants. The layer keeps itself intact by the remaining hydroxide in the filtrate and can be reduced to a minimum thickness by mechanical brushing. The stone can also be cleaned with pressurized air which is pressed from chamber 23 through the stone into chamber 22.

The oil droplets which have been introduced onto the fluid which is to be cleaned can only attach themselves to the suspended particles if the electrostatic charge is large enough so that the difference in potential between droplets and particles binds them together. Furthermore, the droplets must be small enough to be able to move effectively against the viscosity of the liquid. The charge of a particle compared to its substance is larger the larger the surface area of the particle as compared to its volume. Therefore, the sought after agglomeration of oil droplets onto the particles in the waste fluid is more effective the smaller the oil droplets are. Also, the droplets should be as small as possible to increase their mobility. This can be achieved by atomizing liquid oil into the liquid to be cleaned. The oil is compressed utilizing a high pressure pump into a nozzle to greater than about 600 atmospheres pressure usually within the safety range of the apparatus employed of about 600 to 900 atmospheres. When the nozzle is opened, which is achieved through the liquid pressure on a spring which can be regulated to give way at a pressure of 600–700 atmospheres of pressure, then the oil which is reduced in volume exits from the nozzle into the waste fluid (which is under normal pressure) and immediately explodes into millions of little droplets. The extremely small size of the oil droplets produced through the above-mentioned process is of importance for the process of this invention. There are three main reasons for this. First, electrostatically charged particles must be uniformly dispersed in the waste liquid. Second, the smallness of the droplets results in a high electric charge in each droplet compared to its mass. Third, the extremely small size of the droplets makes them highly mobile whereby they can follow the electrostatic attraction, thus effecting the desired coagulation of oil and particles.

Figure 4:
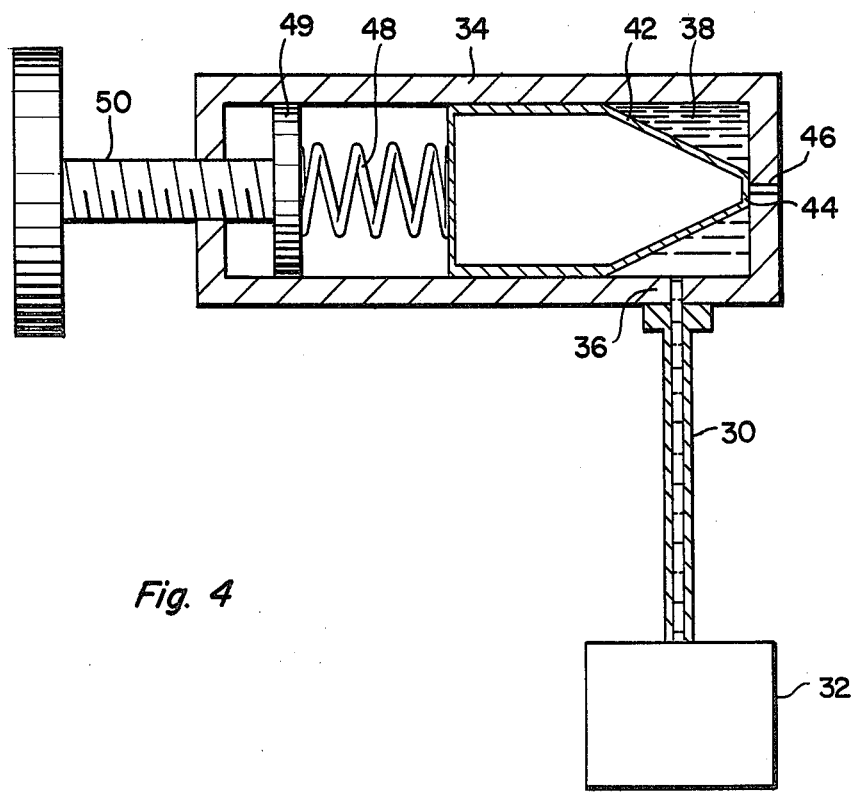

A suitable oil atomizing apparatus is shown in FIG. 4. With this apparatus, liquid under high pressure can be atomized to form electrostatically charged small droplets. The liquid to be atomized is compressed into a limited space to such a pressure that when it is suddenly released from this space through one or several openings, each particle is under such pressure that when exiting into a low pressure area, it breaks up in an explosion-like process to form a very fine and even atomization without the need of any other aids.

Referring to FIG. 4, the liquid which is to be atomized is fed through the pipe 30 from high pressure pump 32 which can be a piston or cog-wheel pump. The liquid transported in pipe 32 is fed into an encasement 34 through channel 36 and arrives in a special afterlying chamber 38 which may be cylindrical. One boundary of the chamber 38 is formed by a piston having a conically shaped leading surface 42 and having an end surface 44 that closes an exit opening 46 with sharp edges. The piston is movable in the encasement 34 and is under the influence of a withholding force, for example, a spring 48 and screw 50 which can be regulated. The liquid transported in the cylinder 38 reaches such a high pressure, regulated through the spring 48, plate 49 and the piston, that the withholding force of the spring 48 is overcome and the piston is pushed away from exit opening 46. Thereafter, the particles of liquid are shattered through an explosive process due to the high pressure difference when they exit through the orifice 46. Typically, the orifice has a diameter of between about 0.1 mm and 0.25 mm when a reciprocating piston in pump 32 has a diameter of about 6 mm. With larger pistons in pump 32, the orifice 46 can be correspondingly larger.

It is possible to place this limited space 38 directly in the pump 32 itself. It has been found that with pressures of 600–800 atmospheres or above, the exiting liquid can be atomized explosively without any additional aids and becomes so even and so fine that there is no need for any device for filtering off large particles. In addition, a plurality of openings 47 and corresponding movable piston surfaces 44 can be utilized. Thus, if the required atomization is achieved through one opening, and if more openings were to be desired in order to achieved a higher degree of spreading, then the total cross-sectional area of these openings should not, to any substantial degree, exceed that of the one opening.

In operation, the pump 32 directs the highly pressurized liquid into cylinder 38 wherein it is slightly compressed, e.g. by about 4%. When the force of the pressurized liquid overcomes the spring 48, the liquid passes through orifice 46 and explodes immediately into the fine mist. Due to the liquid exiting from cylinder 38, the force on spring 48 is reduced, e.g. to about 600 atmospheres and surface 42 returns to the position shown in FIG. 4 to thereby close the orifice 46. Pressure within cylinder 38 then increases and the above-described process is repeated.

Crystal clear filtrates were achieved through the method described, even when the original waste water was extremely polluted, such as oil drilling and grinding oil emulsions or water used for washing with a high oil content. The filtrates were free of taste and smell. In contrast to the high level of toxicity in other waste water, there were no toxic components in the filtrate, as seen when tested on fish.

The process of this invention is in all aspects characterized by its being highly economical. The dirt in the waste water is used to separate the oil. The salts that are introduced for the cleaning process are recovered and continue to function and to clean the waste water. Lastly, it is preferred to use the excess oil sludge which, as described above, is treated with hydrochloride acid in order to convert the hydroxides into soluble and active salts. The sludge, as it is separated can carry out a cleaning function as part of this process before it is regenerated or eliminated. If one simply leads the sludge into the waste water tank before the treatment of the waste water, then it starts functioning by initiating the process of separating the emulsion, thereby to separate the oil from the waste water. The actual filtering plant is relieved of a load by that same volume that was pretreated when the waste water is introduced into the filtering plant.

In the above-quoted example (a daily capacity of some 100 m³ of strongly polluted water with a high oil content), a filtrate was required with a reduced oil content of 100 mg/liter. In order to reach this goal, there was a daily requirement in the prior procedure for chemicals worth $150. When using the process of this invention, this amount is reduced to $16.50 daily and the result is a filtrate which is more than ten times cleaner than the 100 mg/liter, i.e., practically oil-free, totally clear water. Also, in the prior procedure, five large concrete basins were needed for the purification, whereas for the process of this invention, a sheet metal tank with a capacity of 6 m³ as a filtering chamber was sufficient.

I claim:

1. The process for separating contaminating matter from a contaminated carrier liquid through filtration wherein said contaminating matter comprises dissolved or particulate matter or oil with dissolved or particulate matter or oil, which comprises adding to said contaminated carrier liquid oil particles having been formed by subjecting a body of liquid oil to a pressure of at least about 600 atmospheres, said particles having a size between about 0.5 and 15 microns, said particles having an electrostatic charge and having a density lower than said carrier liquid and a composition to induce formation of insoluble hydroxide flocs in said contaminated carrier liquid, passing the resultant mixture into a chamber wherein it separates into an upper clean oil layer, an intermediate filtering layer comprising said formed flocs which contain the contaminants other than the oil in said oil layer and a third layer of cleaned carrier liquid substantially free of said contaminating matter whereby contaminating matter is filtered from said carrier liquid by said filtering layer and recovering said cleaned carrier liquid and said oil in the clean oil layer.

2. The process of claim 1 wherein the liquid particles having a charge comprise hydrocarbon oil.

3. The process of claim 1 wherein the flocs consisting of metal hydroxides are formed by reacting an alkali with metal salts.

4. The process of claim 1 wherein the thickness of the intermediate filtering layer is controlled by (a) draining off filtering agent, (b) by controlling the drainage of the carrier liquid from said chamber or by the combination of steps (a) and (b).

5. The process of any one of claims 1, 2, 3 or 4 wherein the contaminated carrier liquid is introduced into the intermediate filtering layer.

6. The process of any one of claims 1, 2, 3 or 4 wherein the contaminated carrier liquid is introduced over the cross-sectional area of the intermediate filtering layer.

7. The process of any one of claims 1, 2, 3 or 4 wherein the contaminated carrier liquid is mechanically stirred into or swirled into the intermediate filtering layer.

8. The process of any one of claims 1, 2, 3 or 4 wherein the intermediate filtering layer is maintained at a depth of about 50–200 cm.

9. The process of claim 1 wherein the charged oil particles comprise hydrocarbon oil or vegetable oil having a size of 1–5 microns.

10. The process of any one of claims 1, 2, 3 or 4 wherein the said composition induced to form flocs and said oil particles are mixed with the contaminated carrier liquid in a vessel separate from said chamber.

11. The process of any one of claims 1, 2, 3 or 4 wherein the mixture of said composition induced to form flocs, said oil and contaminated carrier liquid is mechanically stirred into or swirled into a cross-sectional area of said intermediate filtering layer below the interface between said oil layer and said filtering layer.

12. The process of any one of claims 1, 2, 3 or 4 wherein the upper clean oil which has risen to the surface of said chamber is siphoned off.

13. The process of any one of claims 1, 2, 3 or 4 wherein an acid is added to the drained-off part of the filtering layer to react with hydroxide in said filtering layer to form salts dissolved in the remaining carrier liquid.

14. The process of claim 13 wherein oil in the drained-off part of the filtering layer rises to the surface and is siphoned off, the salt solution is drained off, recycled to said chamber as a floc forming composition and solid contaminating matter is recovered.

15. The process of any one of claims 1, 2, 3 or 4 wherein fine solid particles, heavier than the carrier liquid, are added to said contaminated carrier liquid so that the flocs that form containing the contaminated matter and the oil particles which have been added sink to the bottom of said chamber, and recovering the resultant mixture from said chamber.

* * * * *